United States Patent Office 3,524,468
Patented Aug. 18, 1970

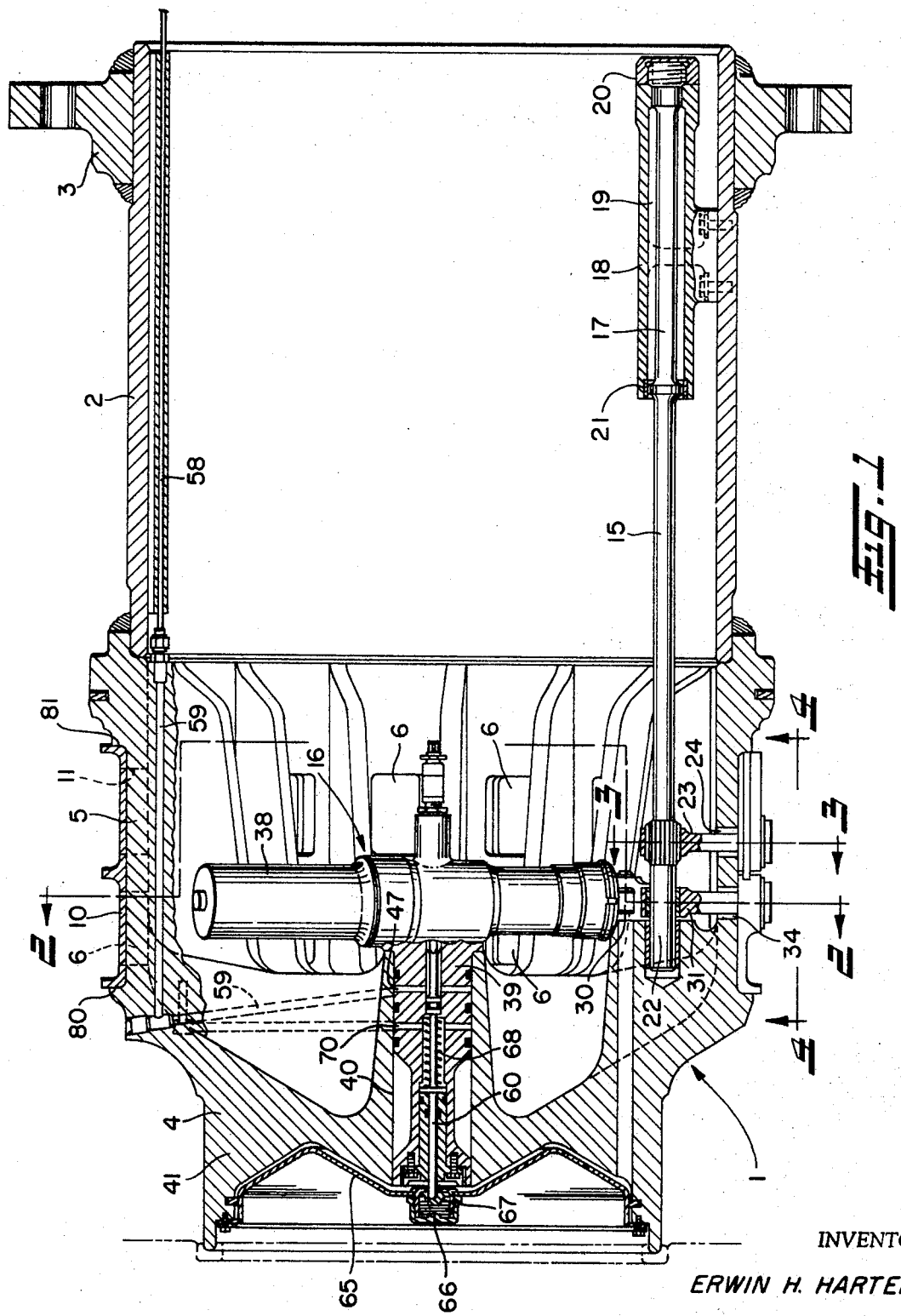

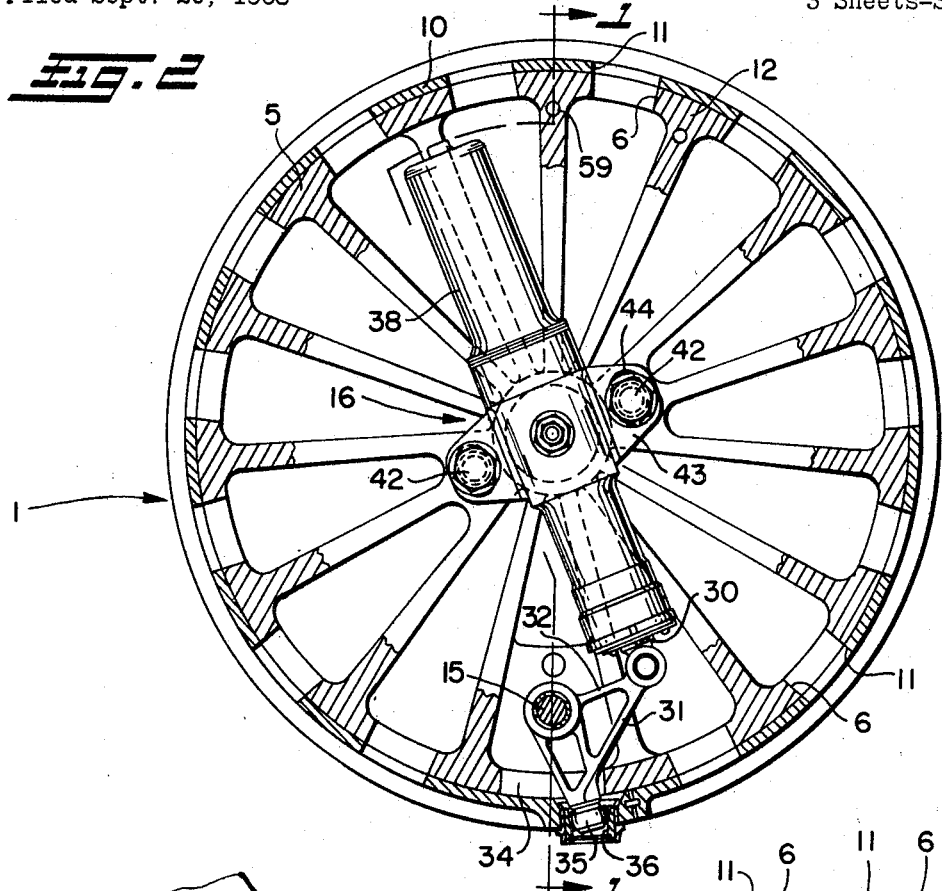
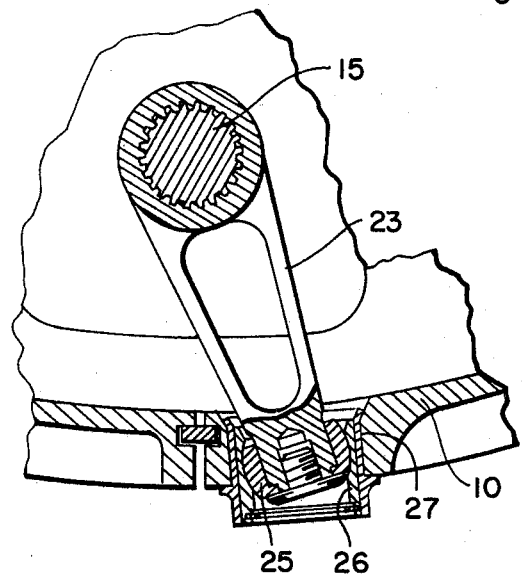
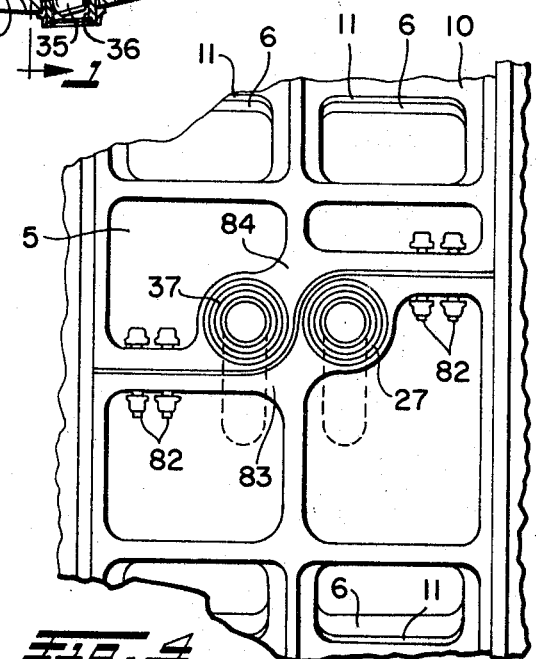

1

3,524,468
SAFETY VENTILATION VALVE
Erwin H. Hartel, Brunswick, Ohio, assignor to The Cleveland Pneumatic Tool Company, Cleveland, Ohio, a corporation of Ohio
Filed Sept. 20, 1968, Ser. No. 761,104
Int. Cl. F16k 31/12
U.S. Cl. 137—494   11 Claims

ABSTRACT OF THE DISCLOSURE

A safety ventilation valve in which the main valving element is a porting ring rotatable about a stationary valve housing, and a torsion bar supplies the actuating force for moving the porting ring from open to closed position.

BACKGROUND OF THE INVENTION

The present invention relates generally as indicated to a safety ventilation valve, and more particularly to such a valve for closing off air-conditioning ducts and the like leading as for example from the earth's surface to underground installations in case of atomic or thermonuclear explosions.

High explosive detonations produce very strong shock waves which if permitted to pass down through air-conditioning ducts and the like leading to underground shelters, plants, and similar structures could have a very destructive effect. Accordingly, various types of valves have been devised for insertion in the ducts to close them off when contacted by an air shock wave load. The most common way to achieve the desired porting action is to displace a ring linearly relative to a stationary valve housing. For relatively low yield atomic explosions, linear motion arrangements of this type are apparently satisfactory, but extremely high yield explosions produce a much greater ground shock wave which may have a detrimental influence on the performance of a linear translating porting ring particularly if the ground accelerations caused by the shock wave are in line with the direction of ring motion.

SUMMARY OF THE INVENTION

All ground shock spectrums, whether direct or air induced are always linear in a vertical or horizontal direction, or any net vector of the two, and consequently a valve arrangement which translates its moving components in a rotary fashion will not be directly responsive to linear type external accelerations, and accordingly it is a principal object of this invention to provide a safety ventilation valve which operates in a rotary manner.

Another important aspect of the safety ventilation valve of this invention is that it is very fast acting, whereby a relatively shorter delay duct than required for previous known valves may be incorporated in the ventilation system to delay the passage of the shock wave until the valve has had time to close, at a substantial savings in cost.

A further object is to provide such a safety ventilation valve which is of a more simple construction and less costly to manufacture.

These and other objects of the present invention may be achieved by providing a safety ventilation valve in which the main valving component is a porting ring rotatable about a stationary valve housing. A torsion bar is used for actuating the porting ring from open to closed position.

2

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:
FIG. 1 is a fragmentary longitudinal section through a preferred form of safety ventilation valve constructed in accordance with this invention;
FIG. 2 is a transverse section through the safety ventilation valve of FIG. 1 taken on the plane of the line 2—2 thereof;
FIG. 4 is an enlarged fragmentary side elevation view of the safety ventilation valve porting ring as seen from the plane of line 4—4 of FIG. 1;
and
FIG. 5 is an enlarged longitudinal section through the torsion rod actuator for the safety ventilation valve.

DESCRIPTION OF THE PREFERRED EMBODIMENT

Figure 3:
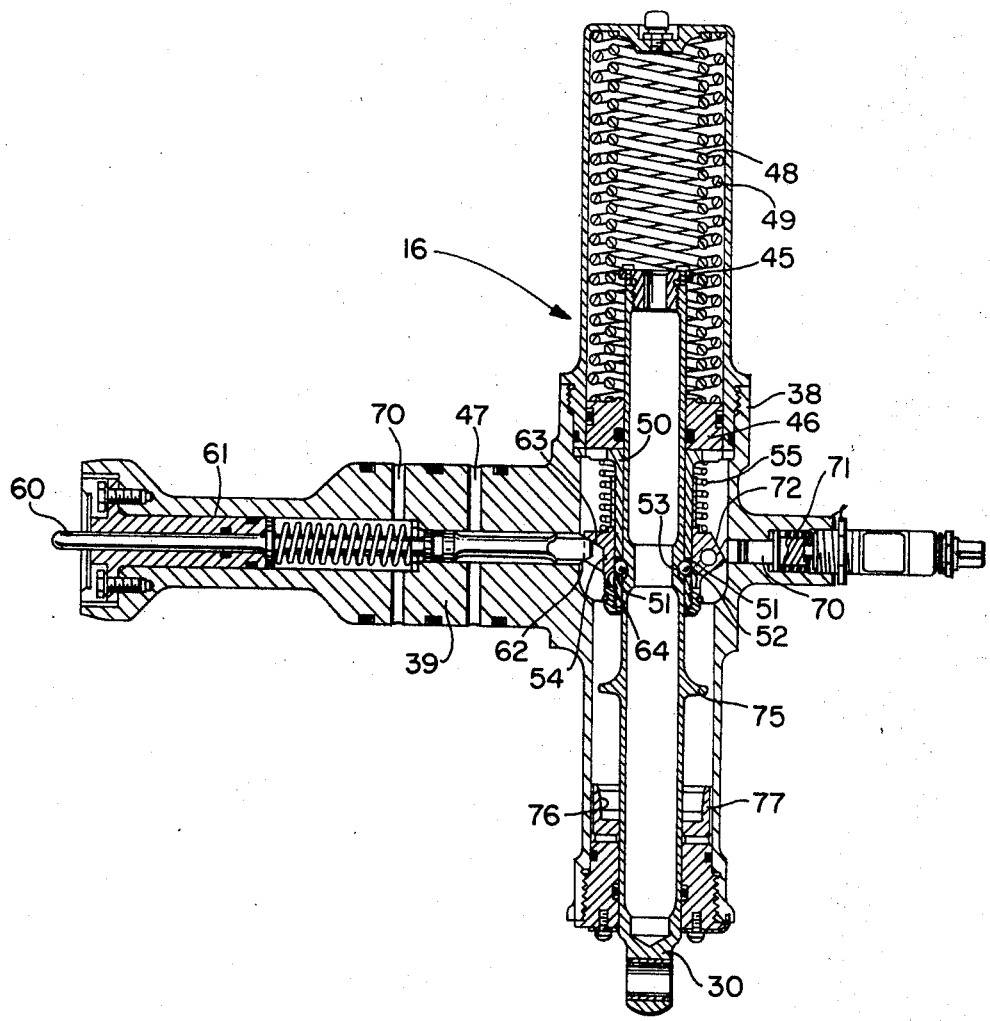
FIG. 3 is an enlarged fragmentary section showing the manner of attachment of the torsion rod to the porting ring, taken on the plane of the line 3—3, FIG. 1.

FIG. 1 shows the various parts of the safety ventilation valve 1 constructed in accordance with this invention, including a main tubular valve housing 2 having a mounting flange 3 at one end for mounting the safety ventilation valve 1 within a ventilation duct in conventional manner, and a bulkhead 4 suitably attached to the other end as by welding. A portion of the outer surface of the bulkhead 4 is desirably carefully machined to provide a cylindrical valve housing 5 of close tolerance having one or more rows of ports 6 (see especially FIGS. 2 and 4) extending around its entire circumference. Surrounding the valve housing 5 is a valve or porting ring 10 having machined ports 11 therein which match the ports 6 in the valve housing 5.

With the ports 11 in the valve ring 10 in alignment with the ports 6 in the valve housing 5, air may be drawn through the air-conditioning ducts to supply an underground facility or exhausted therethrough to the atmosphere. However, should the safety ventilation valve 1 be subjected to a shock wave caused by an explosion, the valve ring 10 will be caused to rotate relative to the bulkhead 4 by means to be later described thus to cause the lands 12 between the valve ring ports 11 to slide over and cover the ports 6 in the bulkhead 4 and thereby prevent the shock wave from passing through the safety ventilation valve 1 into the underground facility and causing destruction. Because the movement of the valve ring 10 is rotary rather than linear, the linear accelerations which are induced into the soil by ground shock waves will not impair the operation of the valve except to the extent that they impose frictional forces which are of secondary importance and can substantially be eliminated by selecting bearing materials which will produce the lowest obtainable friction coefficient. As for example, the inside diameter of the valve ring 10 may be coated with Teflon, and the mating outside diameter of the valve housing 5 may be chrome plated and ground and polished to a high surface finish. Dry film lubricants such as moly coatings may also be used to produce low friction coefficients.

Rotation of the valve ring 10 relative to the valve housing 5 is achieved by means of a torsion bar 15 and fluid actuator 16 associated therewith. One end 17 of the torsion bar 15 is received in a sleeve 18 bolted to the I.D. of the main tubular valve housing 2 where it is held against rotation by splines 19 on the torsion bar 15 and sleeve 18 and a torque coupling 20 secured to such one end. A support bearing 21 within the sleeve 18 prevents torsional instability of the torsion bar 15.

Splined to the other end 22 of the torsion bar 15 is a drive lever 23 which extends radially outwardly therefrom through a slot 24 in the valve housing 5 for attachment to the valve ring 10 by means of a self-aligning ball bearing 25 and sleeve 26 arrangement (see especially FIG. 3). The ball bearing 25 is suitably carried by the outer end of the drive lever 23 and is carried by the sleeve 26 for sliding movement in a lug 27 fixed to the wall of the valve ring 10, thus to permit pivotal movement of the drive lever 23 about the center line of the torsion bar 15 while at the same time allowing the valve ring 10 to remain in contact with the valve housing 5.

A torsion load may be applied to the torsion bar 15 by actuation of the fluid actuator 16 whose actuator rod 30 is connected to the torsion bar 15 by a retaining lever 31. Such retaining lever 31 may be in the shape of a bell crank splined to the torsion bar and having one arm 32 pivotally connected to the actuator rod 30 and the other arm 33 extending through a slot 34 in the valve housing 5 for attachment to the valve ring 10 by a ball bearing 35 and sleeve 36 arrangement slidably received in a lug 37 in the wall of the valve ring 10, similar to the valve ring mounting for the drive lever 23.

The fluid actuator housing 38 has an integral shaft 39 projecting transversely therefrom which fits into a centrally located bore 40 in the end wall 41 of the bulkhead 4 where it is held in position by means of retaining bolts 42 extending through flanges 43 on the actuator housing 38 into the bulkhead end wall 41 as shown in FIG. 2. The holes 44 in the flanges 43 which receive the bolts 42 are slightly elongated to provide sufficient clearance with respect to the bolts 42 to allow the fluid actuator 16 to rotate relative to the valve housing 5 as the actuator rod 30 and retaining lever 31 pivot about the torsion bar 15. The details of construction of the fluid actuator 16 which allows the safety ventilation valve 1 to be cocked in the valve open position and retained in that position until released by a shock wave in the air-conditioning duct acting on the safety ventilation valve will now be described.

As clearly shown in FIG. 5, the actuator rod 30 has a flange 45 on its inner end engageable by a floating piston 46 upon application of fluid pressure to the pressure port 47. Fluid may be supplied to the port 47 from the underground installation through a conduit 58 and passages 59 in the bulkhead 4. During such inward movement of the actuator rod 30, the retaining lever 31 is caused to apply a twisting force to the torsion bar 15 thus to load the torsion bar and move the valve ring 10 through the ball bearing 35-sleeve 36 arrangement to the valve open position. For locking such actuator rod 30 in such retracted position, there is provided a retaining sleeve 50 mounted in the actuator housing 38 against axial movement and having a plurality of openings 51 therein containing balls 52 which are adapted to engage an annular groove 53 in the actuator rod 30 when brought into axial alignment therewith and held in place by movement of a lock sleeve 54 into position overlying the balls 52 as in FIG. 5. The lock sleeve 54 is urged into such position overlying the balls 52 by a lock spring 55 disposed between opposed shoulders on the retaining sleeve 50 and lock sleeve 54, respectively.

To release the actuator rod 30, there is provided a trigger rod 60 contained in an axial bore 61 in the integral shaft 39 and having a tapered wedge-shaped end 62 engaging a tapered ramp 63 on the lock sleeve 54. Movement of the trigger rod 60 toward the lock sleeve 54 will move the lock sleeve 54 against the lock spring 55, thereby bringing the ramp 64 on the end of the lock sleeve 54 into alignment with the balls 52 to free the balls so that they may be displaced outwardly into the larger diameter provided by the ramp 64 out of engagement with the annular groove 53. Now, the actuator rod 30 is free to extend and accordingly the spring tension in the torison rod 15 will accelerate the valve ring 10 toward the valve closing position. Such inward movement of the trigger rod 60 occurs whenever the pressure acting on the blasthead 65 due to shock waves and the like accelerates the blasthead toward the pressure bulkhead 4 to transmit its motion through a spring loaded cartridge 66 and pressure plug 67 on the end of the trigger rod 60 thus to compress the trigger rod spring 68. Alternatively, fluid pressure may be applied to a further pressure port 70 in the integral shaft 39 to effect such inward movement of the trigger rod 60 to permit closing of the valve ring 10 by the occupants of the installation. The motion of the lock sleeve 54 against the lock spring 55 by inward movement of the trigger rod 60 desirably actuates a switch plunger 70 against the force of a plunger spring 71 by engagement with a cam 72 on the lock sleeve 54 to actuate a microswitch which indicates that the lock mechanism is disengaged.

An integral flange 75 on the actuator rod 30 intermediate its length enters an inwardly tapering chamber 76 formed by a gland member 77 in the actuator housing 38 to cushion the movement of the actuator rod 30 when it nears its fully extended position due to the trapped fluid in the chamber 76 which exerts a pressure against the flange 75 thus to decelerate the movement of the valve ring 10 in a controlled manner.

Such use of a torsion bar as the main power spring for actuating rotary valve ring from open to closed position as described above has a major advantage over a conventional coil spring in that the torsion bar is much less responsive to ground shock effects, and is much safer and easier to install. A conventional coil spring which would be sufficient to duplicate the output of a torsion bar would necessarily be rather large and, because of its relatively large force output in its installed length, would be difficult and dangerous to handle and install. Moreover, the valve closing time is greatly reduced when using a torsion bar as the main power spring because it is much faster acting, some five times faster than the conventional linear motion type arrangement whereby a much shorter delay duct may be used for delaying the passage of the shock wave from the blasthead 65 until the valve ring 10 has had sufficient time to close, at a substantial savings in cost.

The valve ring 10 is split as shown in FIG. 4 to facilitate installation on the valve housing 5 between the axially spaced shoulders 80 and 81 (see FIG. 1) by opening the ring up until it attains an inside diameter sufficient to clear the shoulders. Afterwards, the ring is retained in place by installing four bolts 82 to hold the ends 83, 84 of the ring 10 together. The bolts 82 are desirably installed with sufficient end play to insure against overtightening of the valve ring relative to the valve housing 5, since it must be perfectly free to rotate. However, the lugs 27 and 37 for the driver lever 23 and retaining lever 31, respectively, are desirably carried by such opposite ends 83 and 84 adjacent each other so that when the valve ring 10 is in the open position and the torsion rod 15 is maintained under load by the fluid actuator 16, the torsion rod 15 will exert a force on the lug 27 tending to move the ring end 83 toward the adjacent end 84 while at the same time a retarding force will be exerted on the other lug 37 tending to move that end of the ring in the opposite direction thus to tighten the ring diametrically around the valve housing. This will reduce or substantially eliminate any clearance between the I.D. of the valve ring and the O.D. of the valve housing 5 thus to reduce any tendency for dirt and contamination to accumulate between the ring I.D. and valve housing which might otherwise impair the operation of the valve.

Upon release of the fluid actuator 16 as previously described, the retaining force acting on the lug 37 will become zero and the driving force produced by the torsion bar 15 acting on the lug 27 will be free to accelerate the ring 10 relative to the housing. Acceleration takes place until the ports 6 in the valve housing 5 are nearly closed by the valve ring lands 12, at which time the flange 75 on the actuator rod 30 enters the inwardly tapering chamber 76 in the gland member 77 as previously described to develop a retarding force on the actuator rod. Such retarding force is transferred by means of the retaining lever 31 to the valve ring lug 37 thus to oppose the driving force of the torsion rod acting on the other end of the valve ring. Since these forces are opposing each other, they will still tend to tighten the valve ring diametrically around the valve housing, thus establishing a close fit between the valve ring and the ports and thereby assuring a positive seal around the edges of the ports.

Moreover, because the valve ring 10 surrounds the valve housing 5, the overpressure acting on the valve ring tends to further press the valve ring tighter against the edges of the ports in the valve housing. Otherwise, the valve ring is not subjected to any type of loading, and thus the only structural requirements which must be met by valve ring are to provide sufficient flat plate strength to cover each individual port in the valve housing. Accordingly, the structure of the valve ring can be drastically less as compared to a valve ring configuration which is situated on the I.D. of the valve housing. Furthermore, because the fully stopped position of the valve ring 10 relative to the ports 6 in the valve housing 5 is beyond the position where the ports are closed by the lands 12, the greatest portion of the deceleration cycle will take place in the area where the valve ring is operating in the port closed range, and consequently the deceleration of the ring will not affect the closing speeds of the valve. The magnitude of the force experienced will thus greatly be reduced whereby the moving valve components may be very light so that they will not themselves substantially affect the valve response rate.

After closing of the safety ventilation valve 1, it can be restored to a position responsive to another shock wave overpressure by supplying fluid pressure to the pressure port 47 which will act on the floating piston 46 and draw the actuator rod 30 into the actuator against the force of the springs 48 and 49. The actuator rod 30 will be drawn into the actuator cylinder until the mechanical ball lock again secures the actuator rod 30 relative to the retaining sleeve 50, at which time the fluid pressure is reduced to reservoir pressure level and the springs 48 and 49 are allowed to return the floating piston 46 to the position shown in FIG. 5. When the lock sleeve 54 is in the fully locked position as shown and the fluid pressure in the cylinder is reduced to approximately 10 p.s.i., the plunger spring 71 will move the switch plunger 70 against the cam surface 72, resulting in a switch indication which indicates that the safety ventilation valve 1 is in the recocked or ready condition.

As will now be apparent, the safety ventilation valve of the present invention is very fast acting and its performance will not be impaired by shock waves created by explosions, thus making it especially suited for use in air ducts for underground installations which must be quickly closed in the event of a nuclear explosion.

I therefore, particularly point out and distinctly claim as my invention:

1. A valve adapted for installation in a vent duct and the like comprising an annular valve housing having a plurality of circumferentially spaced ports therein, a valve ring associated with said valve housing having a plurality of circumferentially spaced ports therein matching the ports in said valve housing, and means for rotating said valve ring relative to said valve housing in response to a shock wave engaging said valve from a first position in which said ports in said valve ring are in alignment with said ports in said valve housing to a second position in which said ports are out of alignment with each other and said valve ring blocks said ports in said valve housing.

2. The valve of claim 1, wherein said means for rotating said valve ring from said first to said second position comprises a torsion bar having one end fixed with respect to said valve housing, means connecting said valve ring to the other end of said torsion bar for rotation thereby, means for applying a torsion load to said other end of said torsion bar to move said valve ring to said first position, and means for releasing such torsion load to permit said torsion bar to rotate said valve ring to said second position.

3. The valve of claim 2 wherein said means connecting said valve ring to said torsion bar comprises a drive lever projecting radially outwardly from said torsion bar, said drive lever having a self-aligning ball bearing and sleeve arrangement on the outer end thereof axially slidably received in an opening in said valve ring.

4. The valve of claim 2 wherein said means for applying a torsion load to said torsion bar comprises a fluid actuator, a returning lever fixed to said torsion bar and having a pair of arms projecting therefrom, one of said arms being pivotally connected to the actuator rod and the other arm having a self-aligning ball bearing and sleeve arrangement axially slidably received in another opening in said valve ring.

5. The valve of claim 4 further comprising means for applying fluid pressure to said actuator to move said actuator rod to a position applying a torsion load to said torsion bar through said retaining lever, and locking means for releasably locking said actuator rod in such position to permit release of such fluid pressure.

6. The valve of claim 5 further comprising means for releasing said locking means in response to a shock wave engaging said valve thus to free said torsion bar for movement of said valve ring to said second position as aforesaid.

7. The valve of claim 6 further comprising means for cushioning the end movement of said actuator rod after release of said locking means and said ports in said valve ring have moved out of alignment with said ports in said housing.

8. A rotary valve comprising an annular valve housing having a plurality of ports therein, a valve ring telescoped over said valve housing and having a plurality of ports which are adapted to be moved into and out of alignment with the ports in said valve housing through rotation of said valve ring with respect to said valve housing, means for releasably retaining said valve ring in a first position in which said ports are in alignment with each other, and means responsive to a shock wave engaging said valve for rotating said valve ring to a second position in which said ports are out of alignment with each other.

9. The valve of claim 8 wherein said means for rotating said valve ring to said second position comprises a torsion bar operatively connected to said valve ring, and said means for releasably retaining said valve ring in said first position comprises a fluid actuator operatively connected to said valve ring.

10. The valve of claim 9 wherein said fluid actuator is also operatively connected to said torsion bar for applying a torsion load to said torsion bar while retaining said valve ring in said second position, and means are provided for releasing the torsion load applied by said fluid actuator thus to free said torsion bar for movement of said valve ring to said second position as aforesaid.

11. The valve of claim 10 wherein said valve ring is split to provide a pair of ends bolted together, and the connection between said valve actuator and said valve ring is adjacent one end of said valve ring, and the connection between said torsion bar and said valve ring is adjacent the other end of said valve ring, whereby the forces exerted by said fluid actuator and torsion bar on said valve ring tend to move the ring ends toward each other.

References Cited

UNITED STATES PATENTS 3,363,540    1/1968    Mason _____ 98—119

HAROLD W. WEAKLEY, Primary Examiner

U.S. Cl. X.R.

98—119; 137—463, 601